US006639770B2

(12) United States Patent
Tiemann et al.

(10) Patent No.: US 6,639,770 B2
(45) Date of Patent: Oct. 28, 2003

(54) CURRENT TRANSFORMER AND METHOD FOR CORRECTING ASYMMETRIES THEREIN

(75) Inventors: Jerome Johnson Tiemann, Schenectady, NY (US); Richard Dudley Baertsch, Scotia, NY (US)

(73) Assignee: General Electric Company, Niskayuna, NY (US)

(*) Notice: Subject to any disclaimer, the term of this patent is extended or adjusted under 35 U.S.C. 154(b) by 161 days.

(21) Appl. No.: 09/992,296

(22) Filed: Nov. 14, 2001

(65) Prior Publication Data

US 2002/0057182 A1 May 16, 2002

Related U.S. Application Data

(62) Division of application No. 09/455,426, filed on Dec. 6, 1999.

(51) Int. Cl.[7] .................................................. H02H 3/00
(52) U.S. Cl. ............................ 361/45; 336/173; 361/42
(58) Field of Search .............................. 361/42, 45, 44, 361/63; 323/358; 336/173, 174

(56) References Cited

U.S. PATENT DOCUMENTS 4,000,445 A 12/1976 Wilson
4,053,815 A 10/1977 Sircom
4,180,841 A 12/1979 Engel
4,623,865 A 11/1986 Kiesel et al.
5,327,112 A 7/1994 Rossetti
5,828,282 A 10/1998 Tiemann
5,889,450 A 3/1999 Kim et al.
6,414,579 B1 * 7/2002 Tiemann et al. ............ 336/173
6,442,006 B1 * 8/2002 Baertsch et al. .............. 361/42

FOREIGN PATENT DOCUMENTS

EP 0 531 554 A1 3/1993

* cited by examiner

*Primary Examiner*—Shawn Riley
(74) *Attorney, Agent, or Firm*—John F. Thompson; Patrick K. Patnode

(57) ABSTRACT

A current transformer for a ground fault circuit breaker used on a circuit having at least one line conductor and a neutral conductor includes a toroidal core having a circular opening defining a center point and a multi-turn winding wound on the core. A first guide member is disposed on one side of the core, and a second guide member is disposed on another side of the core. The first and second guide members each have a hole for receiving the line conductor and a hole for receiving the neutral conductor formed therein. The guide members thus position the conductors with respect to the core. The present invention also includes a method of correcting asymmetries in the current transformer. The method includes measuring the magnitude and orientation of any asymmetries, and then altering the current transformer based on the measured magnitude and orientation of the asymmetries so as to eliminate the asymmetries.

10 Claims, 2 Drawing Sheets

CURRENT TRANSFORMER AND METHOD FOR CORRECTING ASYMMETRIES THEREIN

This application is a division of application Ser. No. 09/455,426, filed Dec. 6, 1999, which is hereby incorporated by reference in its entirety.

BACKGROUND OF THE INVENTION

This invention relates generally to current transformers and more particularly to current transformers used in ground fault circuit breakers.

Ground fault circuit breakers for alternating current distribution circuits are commonly used to protect people against dangerous shocks due to line-to-ground current flow through someone's body. Ground fault circuit breakers must be able to detect current flow between line conductors and ground at current levels as little as 5 milliamperes, which is much below the overload current levels required to trip conventional circuit breakers. Upon detection of such a ground fault current, the contacts of the circuit breaker are opened to deenergize the circuit.

Current transformers are an integral part of ground fault circuit breakers in that such circuit breakers typically include two of the transformers. A first current transformer, referred to as the ground fault or sense transformer, is used to sense ground fault currents. The sense transformer has as its primary windings the conductors of the distribution circuit being protected, which are encircled by the core, and a multi-turn winding wound on the core. (In the case of a one pole breaker, the line and neutral conductors both go through the sense transformer core, and in the case of a two pole breaker, the two line conductors and the neutral conductor all go through this core. For the sake of example, the following discussion relates to a one pole breaker.) During normal conditions, the current flowing in one direction through the line conductor will return in the opposite direction through the neutral conductor. This produces a net current flow of zero through the transformer, and the multi-turn winding provides no output. However, if a fault (that is, a leakage path) is established between the line conductor and ground, return current will bypass the transformer and flow through the ground back to the grounded side of the source supplying the circuit. Thus, more current will be flowing in one direction through the transformer than in the other, producing a current imbalance. Such a current imbalance produces uncancelled flux in the sense transformer's core, resulting in an output from the multiturn winding that trips the circuit breaker mechanism.

A second current transformer, referred to as the ground neutral transformer, is commonly used to detect neutral-to-ground faults. A neutral-to-ground fault is an inadvertent short between the neutral conductor and ground that may occur due to a fault such as a wiring error by the electrician installing the circuit breaker. Such a leakage path on the load side of the sense transformer does not in itself produce a shock hazard; however, the occurrence of a grounded neutral at the same time as a ground fault on a line conductor will cause the ground fault circuit breaker to be less sensitive in detecting ground fault currents, thereby creating a hazardous situation. A neutral-to-ground fault reduces the sensitivity of the sense transformer as a ground fault sensing device because such a fault tends to provide a return current path via the neutral conductor for a large portion of the line-to-ground leakage current. To the extent that line-to-ground leakage current returns to the source via the neutral conductor, it escapes detection by the sense transformer. Consequently, the sense transformer may not respond to a hazardous ground fault.

In one known application, the ground neutral transformer comprises a core that encircles the neutral conductor (the ground neutral core can, but need not, encircle the line conductor too) and has a multi-turn winding wound thereon. When a neutral-to-ground fault occurs, an inductively coupled path between the sense transformer and the ground neutral transformer is closed. The resultant coupling produces an output in the ground fault sense transformer that trips the circuit breaker mechanism.

Such circuit breakers provide generally satisfactory operation. However, because of a current transformer's finite permeability, a dipolar asymmetry in the magnetic properties of the transformer's core and/or multi-turn winding will exist if the conductors are not symmetrically located in the opening of the transformer. The sense transformer of a ground fault circuit breaker must be able to detect a current imbalance as little as 5 milliamperes in the presence of hundreds of amperes of current. Thus, even a small dipolar asymmetry can produce an unacceptable error that will degrade the sense transformer's ability to detect ground fault currents.

Conventional current transformers often address this problem with magnetic shielding around the core, but magnetic shielding adds considerable cost to the current transformer. Magnetic shielding also increases the volume of the transformer. This can be a problem in ground fault circuit breakers because it can be difficult to package two transformers, the large #12 or #14 conductors, and a printed circuit board (which contains standard circuit breaker circuitry), into the small allotted volume provided in existing circuit breaker housings. This is particularly the case in residential applications for which compact, half-inch circuit breakers are now available.

It is also known to use high saturation core materials, such as those available under the trademark Permalloy, to minimize the dipolar asymmetry. However, such materials are typically more expensive than other common core materials such as ferrite.

Accordingly, there is a need for a current transformer that provides accurate output without using magnetic shielding or expensive materials.

SUMMARY OF THE INVENTION

The above-mentioned need is met by exemplary embodiments of the present invention which provide a current transformer for a ground fault circuit breaker used on a circuit having one or more line conductors and a neutral conductor. The current transformer includes a toroidal core having a circular opening defining a center point and a multi-turn winding wound on the core. A first guide member is disposed on one side of the core, and a second guide member is disposed on another side of the core. The first and second guide members each have a hole for receiving the line conductor and a hole for receiving the neutral conductor formed therein. The guide members thus position the conductors with respect to the core. In addition, a method of correcting asymmetries in the current transformer is provided. The method includes measuring the magnitude and orientation of any asymmetries, and then altering the current transformer based on the measured magnitude and orientation of the asymmetries so as to eliminate the asymmetries.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
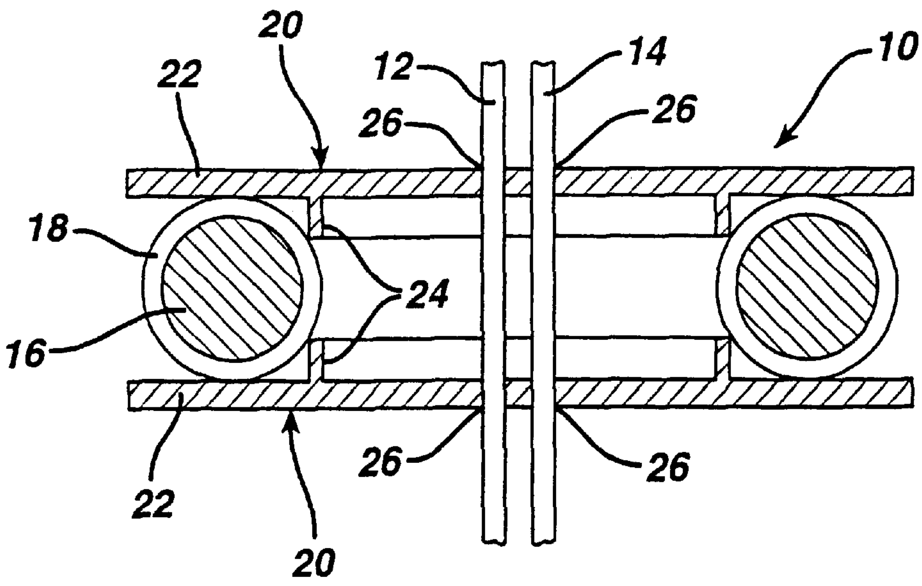
FIG. 1 is a schematic, cross-sectional view of an exemplary embodiment of the current transformer of the present invention.

Referring to the drawings wherein identical reference numerals denote the same elements throughout the various views, FIG. 1 schematically shows a current transformer 10 in cross-section. In a preferred embodiment of the present invention, the current transformer 10 is used in a ground fault circuit breaker that is connected in a two-way alternating current circuit line that delivers electrical energy from a power source (not shown) to a load (not shown). The circuit line has a line conductor 12 and a neutral conductor 14 grounded at the power source as is known in the art. While a transformer in a ground fault circuit breaker is being used as an example to facilitate disclosure of the present invention, it should be recognized that the current transformer of the present invention is not limited to use in ground fault circuit breakers and can be used in many transformer applications.

The current transformer 10 includes a toroidal core 16 having a circular opening that defines a center point. The core 16 encircles both the line conductor 14 and the neutral conductor 16, so that the conductors 14 and 16 function as the single turn winding of the transformer 10. The core 16 is fabricated using a magnetic material, preferably a relatively inexpensive core material such as iron or ferrite. The transformer 10 also includes a multiturn winding 18 that is uniformly wound on the core 16. In a ground fault circuit breaker, the multi-turn winding 18 is electrically connected to conventional circuitry, which, in response to a multi-turn winding output, triggers a trip device that opens the breaker contacts, thereby deenergizing the conductors 12 and 14.

The transformer 10 includes a pair of guide members 20 disposed on opposite sides of the core 16. Each guide member 20 has a flat disk portion 22 and a cylindrical extension 24 extending perpendicularly from the disk portion 22. The cylindrical extension 24 is centered with respect to the disk portion 22 and has a radius that is smaller than the radius of the disk portion 22, but greater than the inside radius of the core 16 with the multi-turn winding 18. Thus, the cylindrical extension 24 fits snugly within the circular opening of the toroidal core 16, thereby centering the disk portion 22 with respect to the core 16. The guide members 20 are made of a nonconducting material such as plastic or fiberglass.

Figure 2:
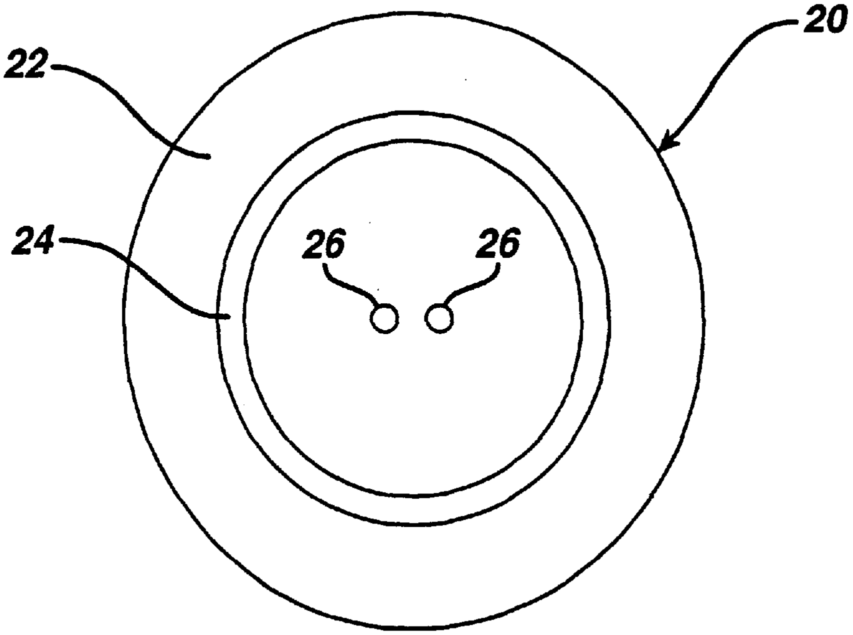
FIG. 2 is a plan view of a guide disk from the current transformer of FIG. 1.

Each guide member 20 has two holes 26 formed therein through which the line and neutral conductors 12 and 14, respectively, are inserted. As best seen in FIG. 2, which shows a single guide member 20, the holes 26 of each guide member 20 are both located very close to the center of the disk portion 22 and are arranged symmetrically with respect to the center of the disk portion 22. By virtue of the cylindrical extension 24 centering the disk portion 22 with respect to the core 16, the holes 26 of each guide member 20 are also located symmetrically with respect to the core 16. Thus, the guide members 20 assure that the line and neutral conductors 12 and 14 are symmetrically located in the opening of the core 16, thereby reducing and controlling the dipolar magnetic field from the single turn winding (i.e., the conductors 12 and 14) of the transformer 10, and thereby reducing dipolar asymmetry without using magnetic shielding or expensive core materials. By locating the holes 26 of each guide member 20 as close as possible to the center point of the corresponding disk portion 22, the effect of quadripole and higher moments will be minimized.

The holes 26 are all sized such that the line conductor 12 and the neutral conductor 14 will fit tightly within its corresponding holes 26. Thus, the guide members 20 will be held in place against the top and bottom of the core 16 by a friction fit between the conductors 12 and 14 and the guide members 20. Optionally, the guide members 20 could be bonded to the core 16 with a suitable adhesive.

Although exemplary embodiments of the present invention have been described in terms of a one pole circuit breaker having one line conductor and one neutral conductor, and thus two holes 26 in each guide member 20, the present invention is also applicable to other breakers such as two pole breakers. In this case, each guide conductor would have three holes for the two line conductors and the neutral conductor. The three holes would be arranged symmetrically with respect to the center of the guide member.

Even with the conductors 12 and 14 located symmetrically in the opening of the core 16, dipolar asymmetries can arise due to asymmetries in the core material and geometry and/or asymmetries in the multi-turn winding 18. In order to avoid using magnetic shielding, a method of manufacturing the current transformer 10 is provided herein whereby inexpensive materials and manufacturing methods are used to produce a transformer, and then additional steps are taken to correct asymmetries arising in the core 16 and/or the multi-turn winding 18.

Figure 3:
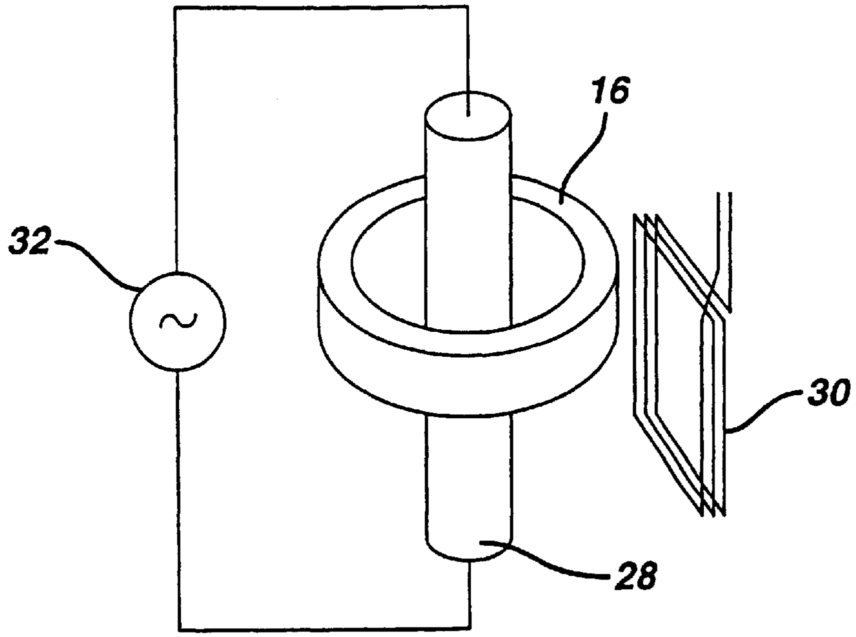
FIG. 3 is a schematic representation of a first approach to correcting asymmetries in a transformer.

One such approach includes measuring the magnitude and orientation of the asymmetries of the core 16 prior to winding. As shown schematically in FIG. 3, the unwound core 16 is excited by a cylindrical excitation conductor 28 located exactly at the core's center of symmetry, and a pick-up coil 30 is placed next to the core 16, oriented in a direction to pick up only the radial component of the resulting magnetic field. The conductor 28 is connected to an excitation source 32, and the output of the pick-up coil 30 is monitored. Since the field from the conductor 28 is precisely tangential, there will not be any direct coupling between the conductor 28 and the pick-up coil 30. Furthermore, if the core 16 is precisely symmetrical, the paramagnetically induced field will also have no radial component. But if the core 16 is not perfectly circularly symmetrical, the induced field will be unbalanced, and a radial component will result. The magnitude of the radial component will be detected by the pick-up coil 30.

The orientation of this radial component can be determined by rotating the core 16 about its axis of symmetry and noting the sinusoidal variation from the pick-up coil 30 with the angle of rotation. A conventional computer would analyze these variations and calculate the amount and location of core material that needs to be removed or added to eliminate the built-in core asymmetry. If core material is needed to be removed this could be accomplished with a grinder. If core material is needed to be added, this could be accomplished by using a paint applicator to apply a magnetic pigment, such as ferrite or powdered iron, to the appropriate location of the core 16.

As an alternative to rotating the core 16 to determine the orientation of the induced field, two pick-up coils can be provided at right angles to each other. These coils will pick up the sine and cosine components of the field, and from these, the magnitude and angle of the induced field can be determined.

Figure 4:
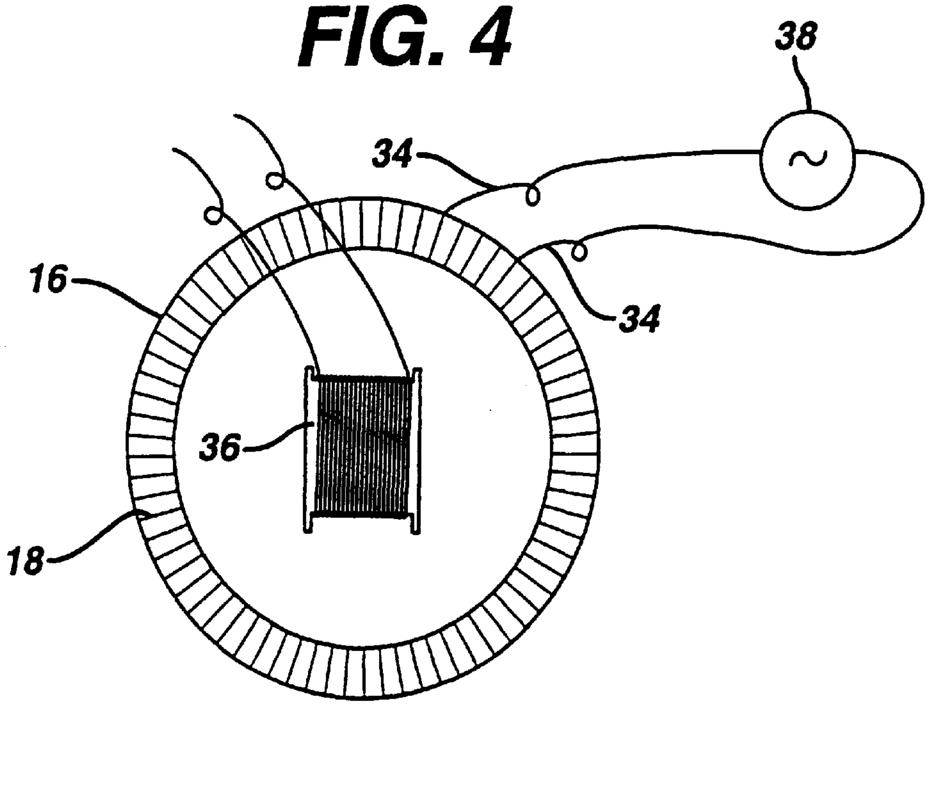
FIG. 4 is a schematic representation of a second approach to correcting asymmetries in a transformer.

A second approach includes measuring the magnitude and orientation of the asymmetries of the transformer 10 after the multi-turn winding 18 has been wound on the core 16. Referring to FIG. 4, the core 16 is shown with the multi-turn winding 18 wound thereon and the multi-turn winding leads 34 extending therefrom. A pick-up coil 36 is located in the opening of the core 16, at the center of symmetry. The multi-turn winding leads 34 are connected to an excitation source 38 so that the multi-turn winding 18 is excited, and the output of the pick-up coil 36 is monitored. The pick-up coil 36 functions as a transformer winding in that if the multi-turn winding 18 is excited and there is zero pick-up in the pick-up coil 36, then there will also be zero pick-up in the multi-turn winding 18 when the pick-up coil is excited due to the reciprocity of transformers. Since the pick-up coil generates a dipole field, a zero pick-up condition will occur when there is no dipole component to the transformer leakage field. But when there is a non-zero pick-up in the pick-up coil 36, this is an indication of a dipolar asymmetry in the core 16 and/or multi-turn winding 18.

The orientation of the induced field can be determined by rotating the core 16 about its axis of symmetry and noting the sinusoidal variation from the pickup coil 36 with the angle of rotation. A conventional computer would analyze these variations and calculate the amount and location of the asymmetry. In this second approach, it would is not practical to make adjustments to the core 16 since it is covered with the multi-turn winding 18. Thus, corrections to the transformer 10 can be made by spraying magnetically loaded paint on an appropriate location of the wound core, or by adding an arcuate strip of magnetic material adjacent to the outer radius of the wound core. Another technique would be to add an additional winding that has the opposite coupling as the induced field to the core 16. Typically, such an additional winding will have only a few turns that are generally all wound in a small, selected region.

Again, as an alternative to rotating the core 16 to determine the orientation of the induced field, two pick-up coils can be provided at right angles to each other. These coils will pick up the sine and cosine components of the field, and from these, the magnitude and angle of the induced field can be determined.

An alternative to modifying the properties of the core and/or the winding, which may be sufficient in some applications, is to orient the guide holes with respect to the core such that the dipole field induced by the two wires is orthogonal to the dipole field induced by the asymmetries of the core or winding. Under these conditions, the dipole field induced by the load current and the neutral return current will not induce any pick-up in the multi-turn winding. Although this will work in single pole applications, it does not work in two pole breakers where three conductors pass through the core and the orientation of the dipole cannot be determined.

The foregoing has described a current transformer that minimizes dipolar asymmetries without using magnetic shielding or expensive core materials. While specific embodiments of the present invention have been described, it will be apparent to those skilled in the art that various modifications thereto can be made without departing from the spirit and scope of the invention as defined in the appended claims.

What is claimed is:

1. A method of correcting asymmetries in a current transformer having a core with a center of symmetry and a multi-turn winding wound on said core, said method comprising the steps of:

measuring the magnitude and orientation of said asymmetries; and altering said current transformer based on the measured magnitude and orientation of said asymmetries so as to eliminate said asymmetries.

2. The method of claim 1 wherein said step of measuring the magnitude and orientation of said asymmetries comprises the sub-steps of:

locating an excitation conductor at said center of symmetry of said core prior to winding said multi-turn winding on said core;

placing a pick-up coil next to said core;

connecting an excitation source to said excitation conductor so that said core is excited by said excitation conductor; and monitoring the output of said pick-up coil.

3. The method of claim 2 further comprising the sub-step of rotating said core about its axis of symmetry.

4. The method of claim 2 wherein said step of altering said current transformer comprises removing material from said core.

5. The method of claim 2 wherein said step of altering said current transformer comprises applying a magnetic pigment to said core.

6. The method of claim 1 wherein said step of measuring the magnitude and orientation of said asymmetries comprises the sub-steps of:

locating a pick-up coil at said center of symmetry of said core after winding said multi-turn winding on said core;

connecting an excitation source to said multi-turn winding so that said multi-turn winding is excited; and monitoring the output of said pick-up coil.

7. The method of claim 6 further comprising the sub-step of rotating said core about its axis of symmetry.

8. The method of claim 6 wherein said step of altering said current transformer comprises placing a strip of magnetic material adjacent to said current transformer.

9. The method of claim 6 wherein said step of altering said current transformer comprises applying a magnetically loaded paint to said current transformer.

10. The method of claim 6 wherein said step of altering said current transformer comprises adding an additional winding to said core.

* * * * *